US012742401B2

(12) United States Patent
Lefebvre et al.

(10) Patent No.: US 12,742,401 B2
(45) Date of Patent: Sep. 22, 2026

(54) TURBINE EXHAUST DUCT FOR AIRCRAFT ENGINE

(71) Applicant: PRATT & WHITNEY CANADA CORP., Longueuil (CA)

(72) Inventors: Guy Lefebvre, St-Bruno-de-Montarville (CA); Francois Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/987,175

(22) Filed: Dec. 19, 2024

(65) Prior Publication Data

US 2026/0176983 A1 Jun. 25, 2026

(51) Int. Cl.

| | |
|---|---|
| ***F01D 25/30*** | (2006.01) |
| ***F01D 9/06*** | (2006.01) |
| ***F01D 25/24*** | (2006.01) |

(52) U.S. Cl.

CPC ............... *F01D 25/30* (2013.01); *F01D 9/06* (2013.01); *F01D 25/24* (2013.01); *F05D 2220/323* (2013.01); *F05D 2240/12* (2013.01); *F05D 2240/14* (2013.01); *F05D 2260/60* (2013.01)

(58) Field of Classification Search

CPC . F01D 25/30; F01D 25/24; F01D 9/06; F05D 2220/323; F05D 2240/12; F05D 2240/14; F05D 2260/60

See application file for complete search history.

(56) References Cited

U.S. PATENT DOCUMENTS

| | | | |
|---|---|---|---|
| 3,152,443 | A | 10/1964 | Newland |
| 3,363,413 | A | 1/1968 | Jones |
| 6,966,172 | B2 | 11/2005 | Nishimura |
| 7,946,809 | B2 | 5/2011 | Meier |
| 9,157,334 | B2 | 10/2015 | Grede |
| 9,850,777 | B2 | 12/2017 | Uesugi |
| 9,880,059 | B2 | 1/2018 | Myers |
| 9,969,500 | B2 | 5/2018 | Anderson |
| 10,514,003 | B2 | 12/2019 | Akcayoz |
| 10,527,288 | B2 | 1/2020 | Stastny |

(Continued)

FOREIGN PATENT DOCUMENTS

| | | | |
|---|---|---|---|
| CA | 2843075 | A1 | 8/2014 |
| EP | 3299592 | A1 | 3/2018 |
| EP | 3299592 | B1 | 3/2020 |

*Primary Examiner* — Brian P Wolcott

(74) *Attorney, Agent, or Firm* — NORTON ROSE FULBRIGHT CANADA LLP

(57) ABSTRACT

A turbine exhaust duct (TED) for an aircraft engine, has: an annular inlet conduit extending around a central axis for directing combustion gases generally in an axial direction; outlet conduits communicating with the annular inlet conduit and extending generally radially outward relative to the annular inlet conduit, the outlet conduits extending from inlet ends at intersections with the annular inlet conduit to outlet ends, an outlet conduit of the outlet conduits having: a forward section facing an axially forward direction and a rearward section opposite the forward section, the forward section and the rearward section conjointly defining an outlet end of the outlet ends; and a reinforcement plate secured to the forward section, the reinforcement plate having a thickness greater than a baseline thickness of the outlet conduit outside the reinforcement plate.

19 Claims, 6 Drawing Sheets

(56) References Cited

U.S. PATENT DOCUMENTS

| | | | | |
|---|---|---|---|---|
| 10,550,767 | B2 | 2/2020 | Eleftheriou | |
| 10,928,069 | B2 | 2/2021 | Stastny | |
| 11,041,461 | B2 | 6/2021 | Beach | |
| 11,319,897 | B2 * | 5/2022 | Joo | F02K 1/40 |
| 11,428,122 | B1 | 8/2022 | Lefebvre et al. | |
| 11,905,844 | B2 * | 2/2024 | Kim | F01D 25/30 |
| 11,999,501 | B2 * | 6/2024 | Joo | F01D 25/30 |
| 12,246,844 | B1 * | 3/2025 | Weaver | F01D 15/10 |
| 2014/0366544 | A1 | 12/2014 | MacCaul | |
| 2021/0215121 | A1 | 7/2021 | Joo et al. | |
| 2022/0205369 | A1 * | 6/2022 | Kim | F01D 25/30 |
| 2023/0138749 | A1 | 5/2023 | Durocher et al. | |
| 2024/0150030 | A1 | 5/2024 | Legras | |
| 2024/0254942 | A1 | 8/2024 | Akcayoz | |
| 2025/0109696 | A1 | 4/2025 | Jamiolkowski et al. | |

* cited by examiner

TURBINE EXHAUST DUCT FOR AIRCRAFT ENGINE

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided a turbine exhaust duct (TED) for an aircraft engine, comprising: an annular inlet conduit extending around a central axis for directing combustion gases generally in an axial direction; outlet conduits communicating with the annular inlet conduit and extending generally radially outward relative to the annular inlet conduit, the outlet conduits extending from inlet ends at intersections with the annular inlet conduit to outlet ends, an outlet conduit of the outlet conduits having: a forward section facing an axially forward direction and a rearward section opposite the forward section, the forward section and the rearward section conjointly defining an outlet end of the outlet ends; and a reinforcement plate secured to the forward section, the reinforcement plate having a thickness greater than a baseline thickness of the outlet conduit outside the reinforcement plate.

The turbine exhaust duct described above may include any of the following features, in any combinations.

In some embodiments, the reinforcement plate is received within a cut-out defined in the outlet conduit.

In some embodiments, the cut-out has a cut-out edge and the reinforcement plate has a peripheral edge bonded to the cut-out edge.

In some embodiments, a weld joint is located at an intersection between the cut-out edge and the peripheral edge of the reinforcement plate.

In some embodiments, the reinforcement plate is devoid of weld joint but for at the peripheral edge.

In some embodiments, the reinforcement plate overlaps a high-stress area of the outlet conduit.

In some embodiments, the outlet conduit defines an outlet edge, an annular member being mounted to the outlet edge and extending a full periphery of the outlet end, the outlet end defined by the annular member, the annular member having a thickness greater than the baseline thickness.

In some embodiments, the reinforcement plate and the annular member are joined via a weld joint.

In some embodiments, a ratio of the thickness of the reinforcement plate to the baseline thickness is at least 1.

In some embodiments, exhaust rings are mounted to the outlet ends of the outlet conduits.

In some embodiments, the exhaust rings have peripheral flanges securable to a case of the aircraft engine.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings; a turbine exhaust duct fluidly communicating with the turbine section, the turbine exhaust duct having: an annular inlet conduit extending around the central axis; outlet conduits communicating with the annular inlet conduit and extending through the openings of the exhaust case, the outlet conduits extending from inlet ends at intersections with the annular inlet conduit to outlet ends, an outlet conduit of the outlet conduits having a redirecting section that curves from a substantially axial orientation to a substantially radial orientation, the redirecting section configured to be impinged by combustion gases exiting the turbine section and to divert the combustion gases radially outwardly, the redirecting section having a thickness greater than a baseline thickness of the outlet conduit outside the redirecting section.

The reverse-flow gas turbine engine described above may include any of the following features, in any combinations.

In some embodiments, the redirecting section is at least partially defined by a reinforcement plate received within a cut-out defined in the outlet conduit.

In some embodiments, the cut-out has a cut-out edge and the reinforcement plate has a peripheral edge bonded to the cut-out edge.

In some embodiments, a weld joint is located at an intersection between the cut-out edge and the peripheral edge of the reinforcement plate.

In some embodiments, the reinforcement plate is devoid of weld joint.

In some embodiments, the redirecting section overlaps a high-stress area of the outlet conduit.

In some embodiments, the outlet conduit defines an outlet edge, a annular member being mounted to the outlet edge and extending a full periphery of the outlet end, the outlet end defined by the annular member, the annular member having a thickness greater than the baseline thickness.

In some embodiments, a reinforcement plate defines the redirection section, the reinforcement plate and the annular member are joined via a weld joint.

In some embodiments, a ratio of the thickness to the baseline thickness being at least 1.

DESCRIPTION OF THE DRAWINGS

Reference is now made to the accompanying figures in which.

DETAILED DESCRIPTION

Figure 1:
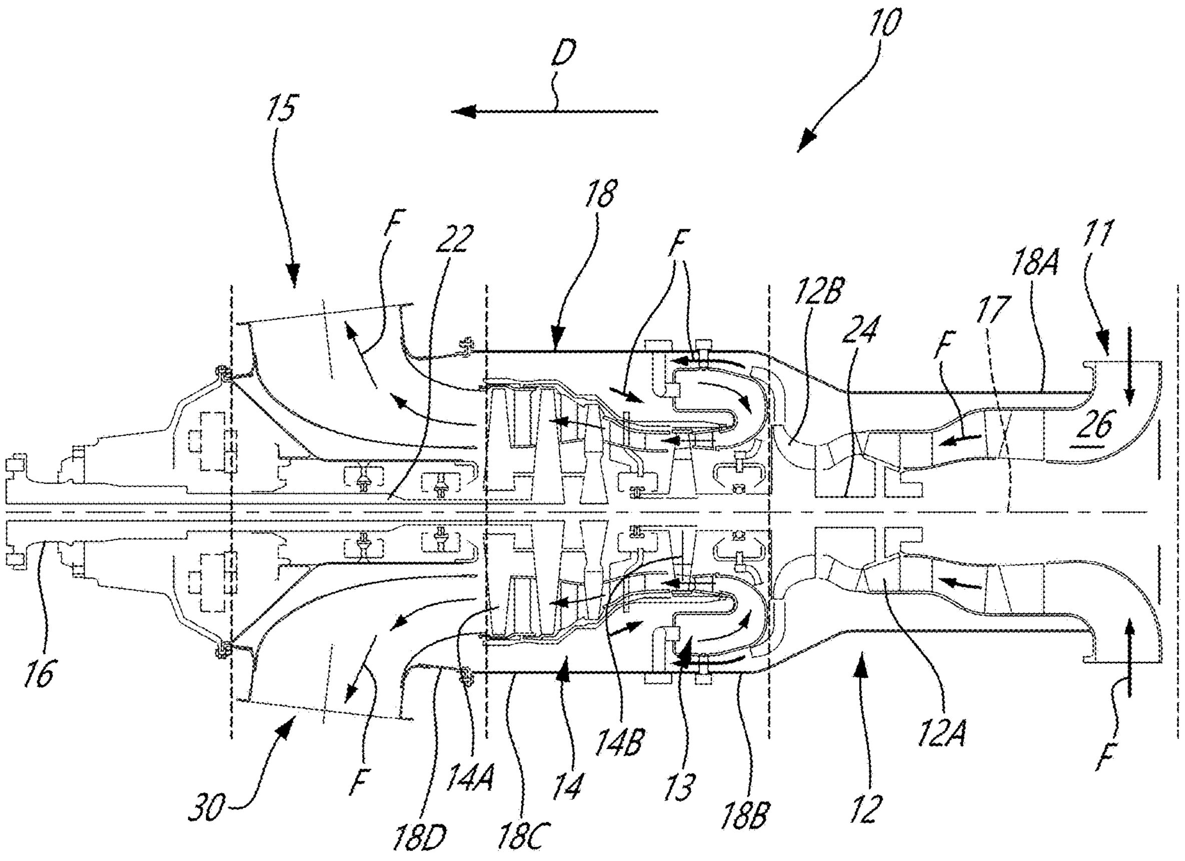
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
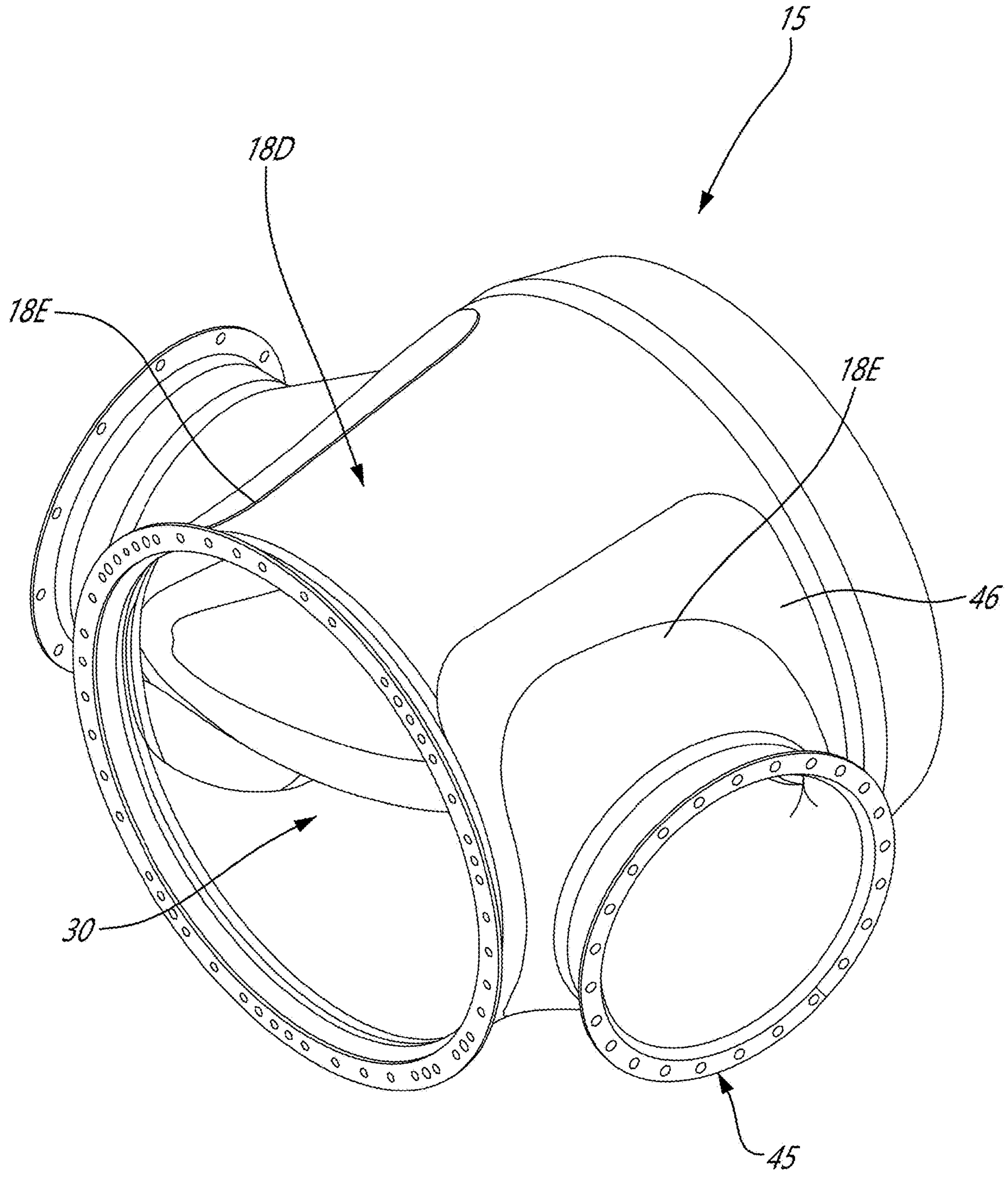
FIG. 2 is a three dimensional view of an exhaust system of the aircraft engine of FIG. 1.
Figure 3:
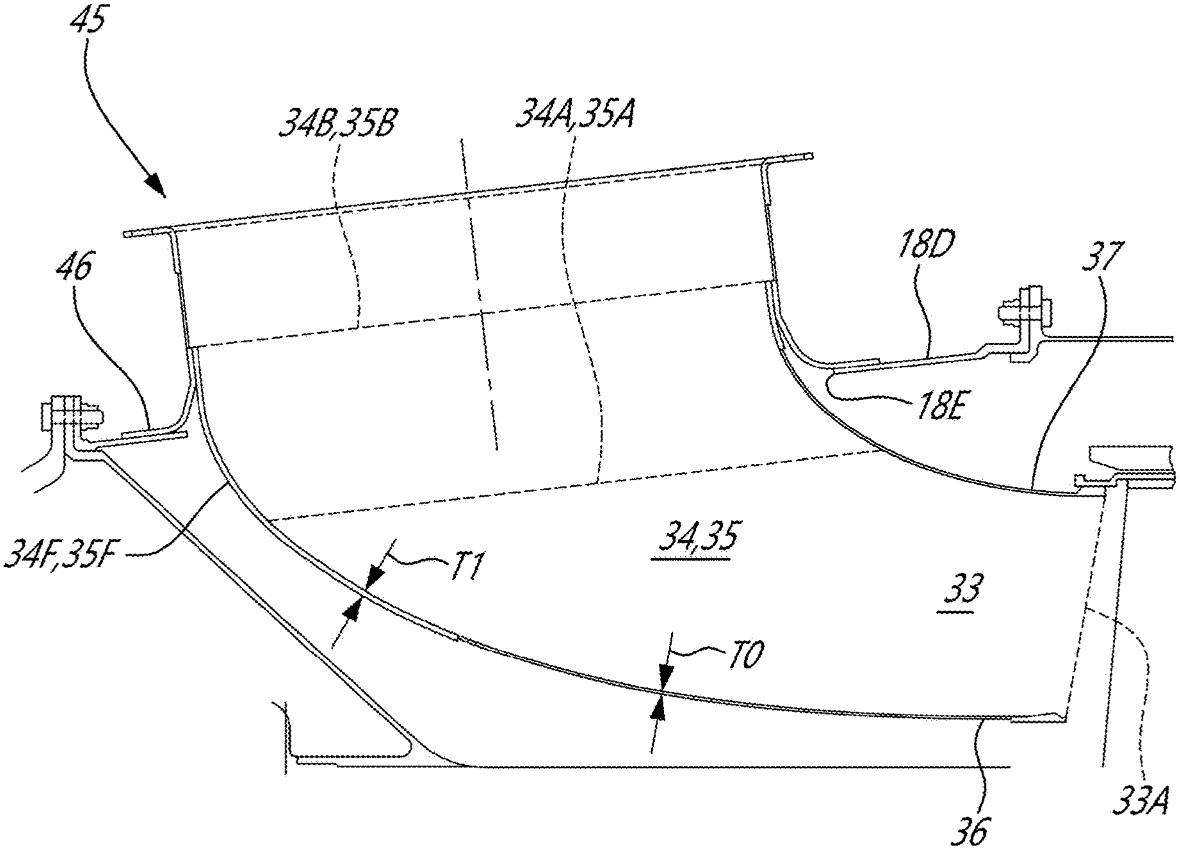
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
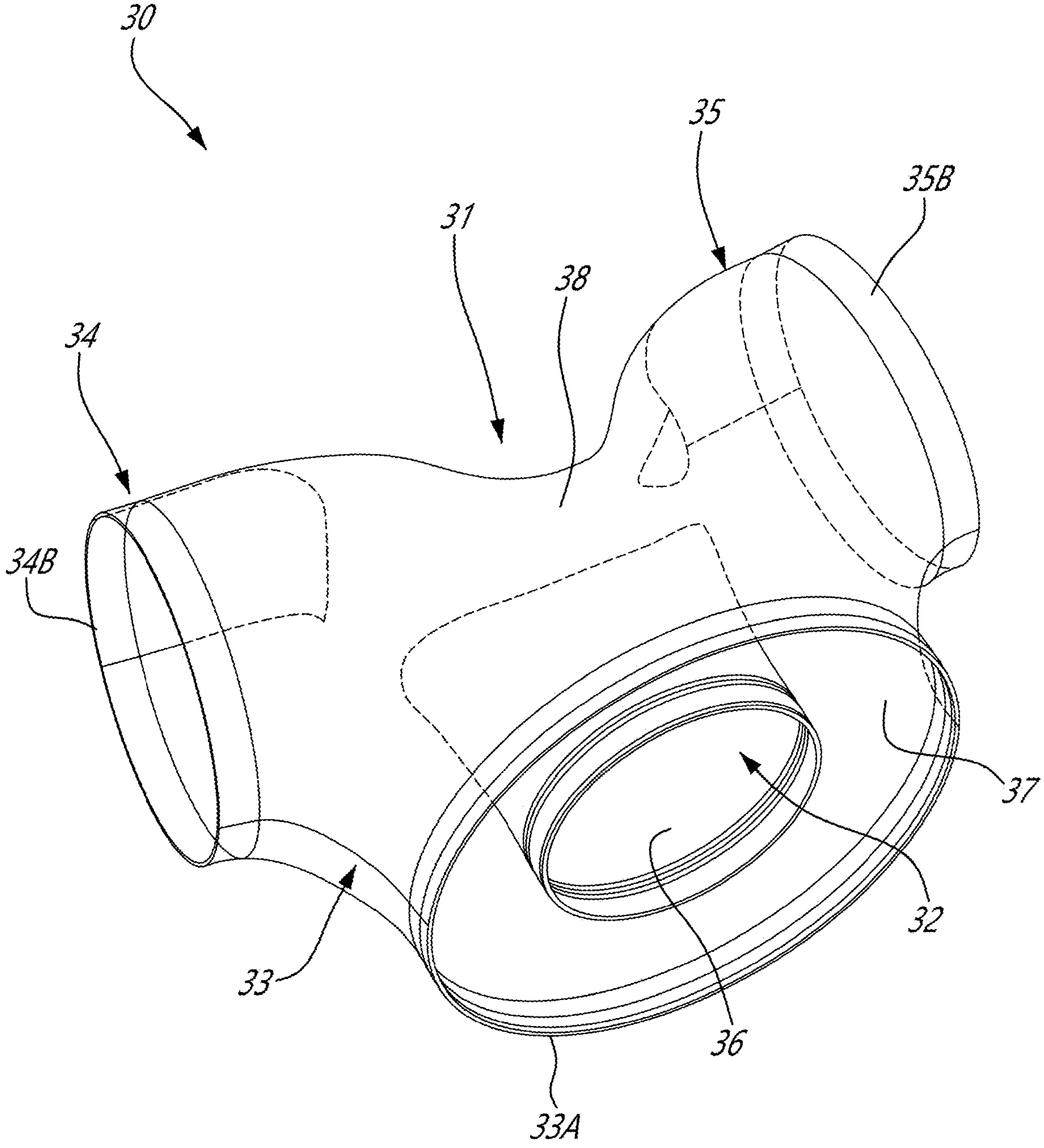
FIG. 4 is a three dimensional view of a turbine exhaust duct of the exhaust system of FIG. 3.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit portion 34, 35 projects outwardly of the exhaust case 18D. As best shown in FIG. 3, each outlet conduit portion 34, 35 terminates into an exhaust port. The outlet conduits extend along respective axes that intersect the central axis 17. According to the illustrated embodiment, these axes has a main radial component and a secondary (i.e. smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Figure 5:
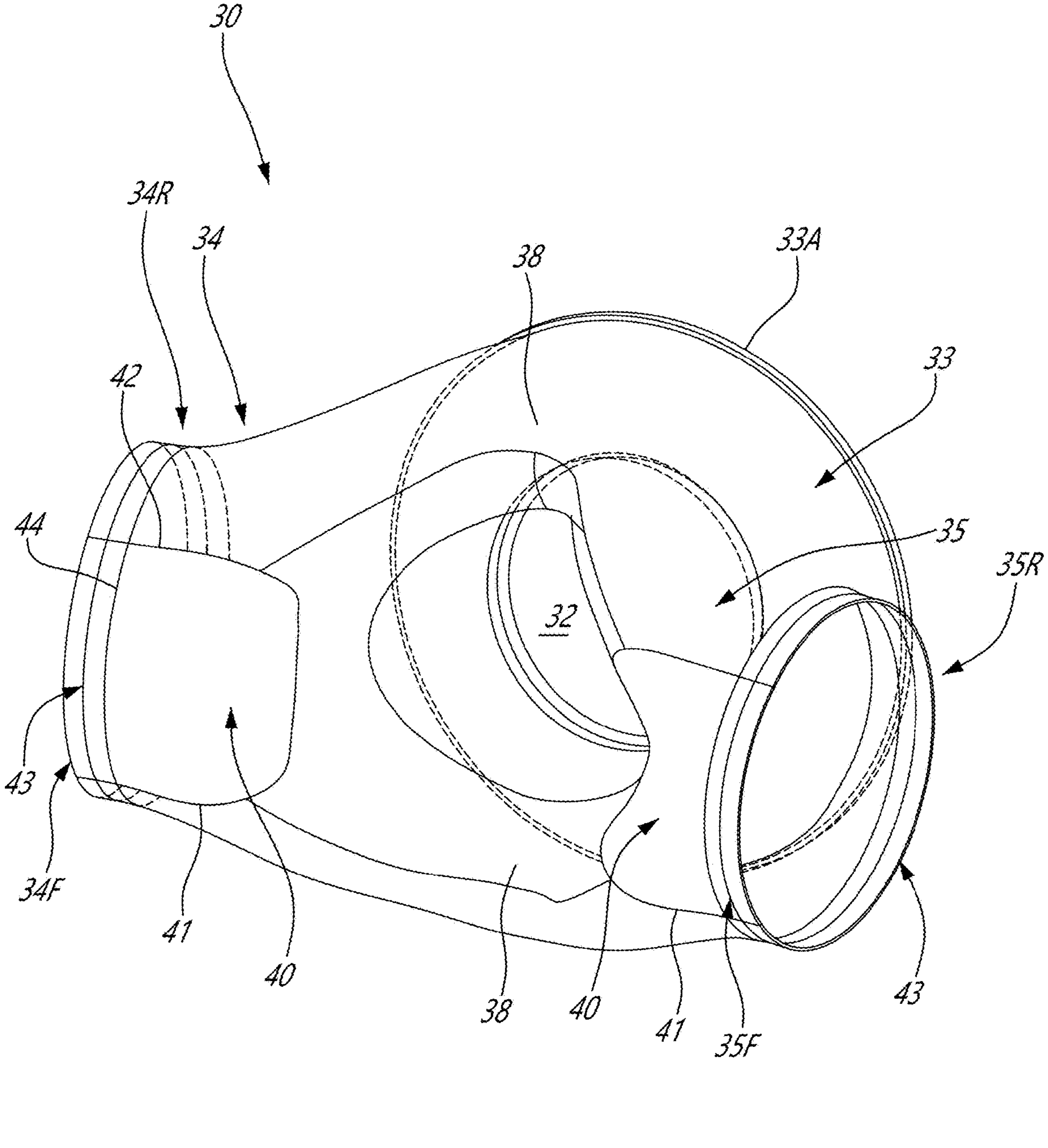
FIG. 5 is another three dimensional view of the turbine exhaust duct of FIG. 4.

Referring to FIGS. 3-5, the turbine exhaust duct 30, in this embodiment is a dual ports exhaust duct, and is formed by a generally Y-shaped body 31. The body 31 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIG. 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Still referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at the outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

It has been observed by the inventors of the present disclosure that, at engine start-up, the circulation of hot gases passing through the turbine section 14 generate severe thermal displacement at attachment points between the turbine exhaust duct 30 and the exhaust case 18D. There is therefore a need to improve the structure to meet the dynamic margin while retaining flexibility for thermal growth. This is challenging since the structure has to meet the dynamic margin while retaining some flexibility for thermal growth. According to some aspects, the turbine exhaust duct 30 may be tunable to meet analytical expectations.

In some embodiments, the turbine exhaust duct 30 provides a structural gas path by introducing a variable sheet metal construction in a critical area, for example by removing the weld joint in the critical area and repositioning it in a low-stress area. As will be seen hereafter, this design may be also adjustable, as it may allow the stiffness of the gas path in the critical zone to be adjusted to repel dynamic modes and reduce thermal stresses. Such a design may eliminate the thickness variation generated by multiple welds. According to other general aspects, the median fiber of the material thickness remains constant, thereby reducing stress concentration in the weak zone of the reverse-flow gas path. In some embodiments, the turbine exhaust duct 30 may allow a reverse flow exhaust duct to sustain higher temperatures. This mechanical arrangement may allow to tune and meet the desirable life.

Referring to FIG. 5, the outlet conduits 34, 35 have each a forward section 34F, 35F facing an axially forward direction, that is, facing away from the turbine section 14, and a rearward section 35R, 35R opposite the forward section 34F, 35F. The forward sections 34F, 35F and the rearward sections 34R, 35R conjointly define the outlet ends 34B, 35B of the outlet conduits 34, 35. The forward sections 34F, 35F may be referred to as redirecting sections since they curve from a substantially axial orientation to a substantially radial orientation relative to the central axis 17. The forward sections 34F, 35F are configured to be impinged by combustion gases exiting the turbine section 14 and to divert the combustion gases radially outwardly. Therefore, at least a portion of the forward sections 34F, 35F are impinged by the combustion gases.

In the context of the present disclosure, the expressions "substantially" as in "substantially radial" implies that a main component of the direction is radial even if the direction may have one or both of an axial and circumferential component. In other words, by being "substantially radial", the radial component of the direction is greater than the axial component.

In use, the forward sections 34F, 35F are impinged by the hot combustion gases.

During engine start-up, the combustion gases may quickly heat the forward sections 34F, 35F while a remainder of the outlet conduits 34, 35 are still cold. This may create thermal growth and thermal fight between different sections of the outlet conduits 34, 35. This may lead to damage to the turbine exhaust duct 30.

To at least partially alleviate this drawback, reinforcement plates 40 are secured to the forward sections 34F, 35F. The reinforcement plates 40 therefore overlap high-stress areas of the outlet conduits 34, 35, which are impinged by the combustion gases. The reinforcement plates 40 have a thickness T1 (FIG. 3) greater than a baseline thickness TO (FIG. 3) outside the reinforcement plates 40. A ratio of the thickness T1 of the reinforcement plate to the baseline thickness TO may be from 1 to 3, preferably at least about 2. Put differently, at least a portion of the forward sections 34F, 35F are defined by the reinforcement plates 40. The portions of the forward sections 34F, 35F are configured to be intersected by a flow of the combustion gases. The portions of the forward sections 34F, 35F are thus extending substantially transversally to the central axis 17 of the gas turbine engine 10. In the context of the present disclosure, the expression "about" implies variations of plus or minus 10%.

The reinforcement plates 40 may cover at least from about 25% to about 50% of a circumference of the outlet conduits 34, 35. The reinforcement plates 40 may extend a length, in a direction normal to the circumference of the outlet conduits, of at least 25% to 50% of the circumference of the outlet conduits 34, 35. The length of the plates 40 may extend up to 50% of an overall length of the TED 30 from the inlet end to the outlet ends.

Figure 6:
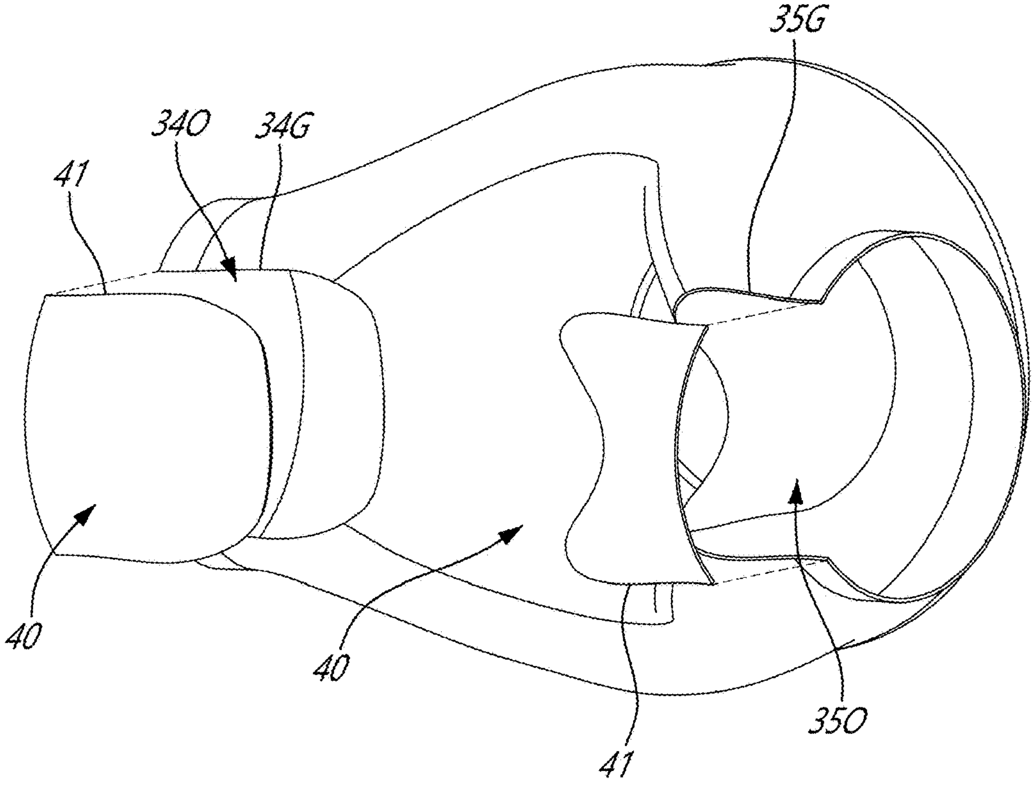
FIGS. 6-7 are three dimensional views illustrating an assembly sequence of the turbine exhaust duct of FIG. 4.

Referring to FIGS. 5-6, the reinforcement plates 40 have each a peripheral edge 41 and the outlet conduits 34, 35 each define a cut-out 340, 350 having a cut-out edge 34G, 35G. The peripheral edges 41 of the reinforcement plates 40 are bounded (e.g., welded, brazed) to the cut-out edges 34G, 35G. A weld joint 42 may be located at the intersections between the cut-out edges 34G, 35G and the peripheral edges 41 of the reinforcement plates 40. In some embodiments, the reinforcement plates 40 may be secured over a material of the outlet conduits 34, 35. In other words, the reinforcement plates 40 may overlap sheet metal of the outlet conduits 34, 35.

In the embodiment shown, the reinforcement plates 40 permit the omission of weld joint at the zone of the outlet conduits 34, 35 most impinged by the hot combustion gases. Thus, the drawbacks discussed above may be mitigated since the outlet conduits 34, 35 are devoid of weld joint within an area covered by the reinforcement plates 40. In other words, the reinforcement plates 40 are devoid of weld joint but at their respective peripheries.

The outlet conduits 34, 35 may define outlet edges 34H, 35H and annular members 43 are bounded to the outlet edges 34H, 35H and to the peripheral edges 41 of the reinforcement plates 40. Put differently, the outlet edges 34H, 35H are interrupted at the cut-outs 340, 350 and the peripheral edges 41 of the reinforcement plates 40 complete a full circumference of the outlet ends of the outlet conduits 34, 35. The annular members 43 are then bounded (e.g., welded, brazed) to a portion of the peripheral edges 41 of the reinforcement plates 40 and to the outlet edges 34H, 35H of the outlet conduits 34, 35. Weld joints 44 may be disposed at intersections between the annular members 43 and the outlet conduits 34, 35 and reinforcement plates 40. The weld joints 44 may extend a full circumference of the outlet conduits 34, 35. The annular members 43 also have a thickness greater than the baseline thickness TO. The annular members 43 may have the same thickness T1 as the reinforcement plates 40. In some embodiments, the reinforcement plates 40 and the annular members 43 may be parts of a single monolithic body.

Referring back to FIG. 3, in the embodiment shown, exhaust rings 45 are mounted to the outlet ends 34B, 35B of the outlet conduits 34, 35. The exhaust rings 45 include peripheral flanges 46 that overlap the exhaust case 18D. The peripheral flanges 46 of the exhaust rings 45 may be welded to an outer side of the exhaust case 18D.

Figure 7:
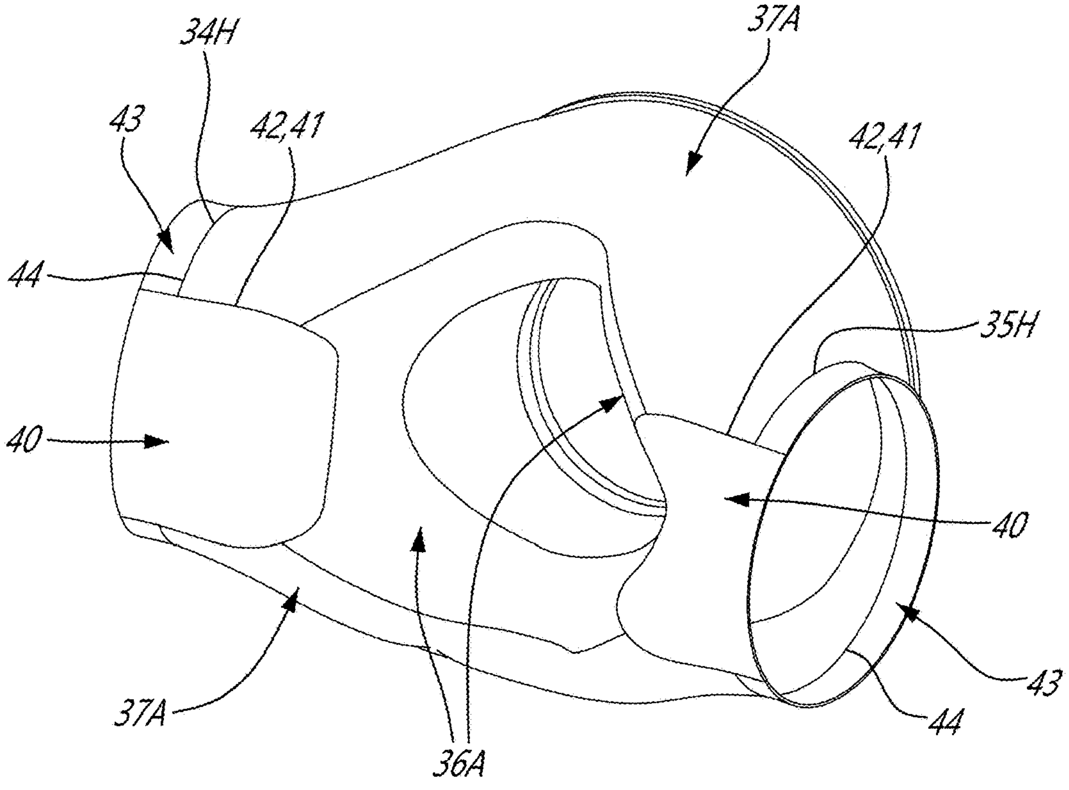

Referring now to FIG. 7, in the embodiment shown, the turbine exhaust duct 30 may be made of a plurality of parts welded together. These parts include: the inner peripheral wall 36, which includes two inner wall sections 36A welded to each other and each defining a portion of a respective one of the outlet conduits 34, 35; the outer peripheral wall 37 that includes two outer wall sections 37A each being welded to a respective one of the two inner wall sections 36A; the two reinforcement plates 40 that are each secured to both of the outer wall sections 37A and to both of the inner wall sections 36A; and the annular members 43 that are each secured to a respective one the reinforcement plates 40, to both of the inner wall sections 36A and to both of the outer wall sections 37A.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbine exhaust duct (TED) for an aircraft engine, comprising:

an annular inlet conduit extending around a central axis for directing combustion gases generally in an axial direction;

outlet conduits communicating with the annular inlet conduit and extending generally radially outward relative to the annular inlet conduit, the outlet conduits extending from inlet ends at intersections with the annular inlet conduit to outlet ends, an outlet conduit of the outlet conduits surrounding a flow passage for receiving the combustion gases from the annular inlet conduit, the outlet conduit having a conduit axis being transverse to the central axis, the outlet conduit having:

a forward section facing an axially forward direction and a rearward section opposite the forward section, the forward section and the rearward section conjointly defining an outlet end of the outlet ends; and a reinforcement plate secured to the forward section, the reinforcement plate having a thickness greater than a baseline thickness of the outlet conduit outside the reinforcement plate, the reinforcement plate having an inner face facing the flow passage and being exposed to the combustion gases, the inner face oriented radially towards the conduit axis.

2. The TED of claim 1, wherein the reinforcement plate is received within a cut-out defined in the outlet conduit.

3. The TED of claim 2, wherein the cut-out has a cut-out edge and the reinforcement plate has a peripheral edge bonded to the cut-out edge.

4. The TED of claim 3, wherein a weld joint is located at an intersection between the cut-out edge and the peripheral edge of the reinforcement plate.

5. The TED of claim 4, wherein the reinforcement plate is devoid of weld joint but for at the peripheral edge.

6. The TED of claim 1, wherein the reinforcement plate overlaps a high-stress area of the outlet conduit.

7. The TED of claim 1, wherein the outlet conduit defines an outlet edge, an annular member being mounted to the outlet edge and extending a full periphery of the outlet end, the outlet end defined by the annular member, the annular member having a thickness greater than the baseline thickness.

8. The TED of claim 7, wherein the reinforcement plate and the annular member are joined via a weld joint.

9. The TED of claim 1, wherein a ratio of the thickness of the reinforcement plate to the baseline thickness is greater than 1.

10. The TED of claim 1, further comprising exhaust rings mounted to the outlet ends of the outlet conduits, the exhaust rings having peripheral flanges securable to a case of the aircraft engine.

11. A reverse-flow gas turbine engine, comprising:

an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings;

a turbine exhaust duct fluidly communicating with the turbine section, the turbine exhaust duct having:

an annular inlet conduit extending around the central axis;

outlet conduits communicating with the annular inlet conduit and extending through the openings of the exhaust case, the outlet conduits extending from inlet ends at intersections with the annular inlet conduit to outlet ends, an outlet conduit of the outlet conduits having a redirecting section that curves from a substantially axial orientation to a substantially radial orientation, the outlet conduit having a conduit axis, the redirecting section configured to be impinged by combustion gases exiting the turbine section and to divert the combustion gases radially outwardly, the redirecting section having a thickness greater than a baseline thickness of the outlet conduit outside the redirecting section, the redirecting section defining part of a flow passage of the outlet conduit, the redirecting section having an inner face facing the flow passage and being exposed to the combustion gases, the Inner face facing the conduit axis.

12. The reverse-flow gas turbine engine of claim 11, wherein the redirecting section is at least partially defined by a reinforcement plate received within a cut-out defined in the outlet conduit.

13. The reverse-flow gas turbine engine of claim 12, wherein the cut-out has a cut-out edge and the reinforcement plate has a peripheral edge bonded to the cut-out edge.

14. The reverse-flow gas turbine engine of claim 13, wherein a weld joint is located at an intersection between the cut-out edge and the peripheral edge of the reinforcement plate.

15. The reverse-flow gas turbine engine of claim 14, wherein the reinforcement plate is devoid of weld joint.

16. The reverse-flow gas turbine engine of claim 11, wherein the redirecting section overlaps a high-stress area of the outlet conduit.

17. The reverse-flow gas turbine engine of claim 11, wherein the outlet conduit defines an outlet edge, an annular member being mounted to the outlet edge and extending a full periphery of the outlet end, the outlet end defined by the annular member, the annular member having a thickness greater than the baseline thickness.

18. The reverse-flow gas turbine engine of claim 17, wherein a reinforcement plate defines the redirection section, the reinforcement plate and the annular member are joined via a weld joint.

19. The reverse-flow gas turbine engine of claim 11, wherein a ratio of the thickness to the baseline thickness being greater than 1.

* * * * *